United States Patent [19]

Le Moal

[11] Patent Number: 4,827,625

[45] Date of Patent: May 9, 1989

[54] TEMPLATE FOR CUTTING TILES AND THE LIKE

[76] Inventor: Yannick H. V. Le Moal, Moulin de Botterf, Plougoumelen, 56400 Auray, France

[21] Appl. No.: 134,495

[22] Filed: Dec. 18, 1987

[30] Foreign Application Priority Data

Dec. 18, 1986 [FR] France ................................ 86 17922

[51] Int. Cl.[4] .................................................. G01B 3/30

[52] U.S. Cl. ......................................... 33/527; 33/562; 33/DIG. 20

[58] Field of Search ................. 33/562, 565, 566, 526, 33/527, DIG. 9, DIG. 20, 419, 454, 456

[56] References Cited

U.S. PATENT DOCUMENTS

| | | | |
|---|---|---|---|
| 2,144,697 | 1/1939 | Zangrando | 33/527 |
| 2,619,173 | 11/1952 | Crain | 33/DIG. 20 |
| 2,770,043 | 11/1956 | Kwiecinski | 33/DIG. 20 |
| 3,548,505 | 12/1970 | Di Candilo | 33/527 |
| 3,718,980 | 3/1973 | Poulos | 33/526 |
| 4,062,123 | 12/1977 | Lundquist | 33/419 |

*Primary Examiner*—William A. Cuchlinski, Jr.
*Assistant Examiner*—Patrick R. Scanlon
*Attorney, Agent, or Firm*—Robert A. Sloman; Raymond E. Scott; Richard Graver

[57] ABSTRACT

A template for cutting floor-covering tiles or the like. The template comprises a deformable frame having five flat strips which are fixed together end-to-end, said strips comprising: (a) a thrust strip (1) provided with a positioning abutment (10); (b) two side strips (2, 3) capable of sliding perpendicularly to the thrust strip (1); and (c) a set of two line-of-cut strips (4, 5) which are hinged to each other, and which are also hinged to the ends of the two side strips (2, 3) by means of shafts (21, 31) capable of longitudinal sliding relative thereon; locking members (15, 16) being provided to enable the set of strips (1, 2, 3, 4, 5) to be locked in any desired mutual position. This instrument is used for cutting peripheral tiles when laying a covering on a floor, a wall, or a ceiling. The invention is particularly applicable to carpet tiles.

10 Claims, 4 Drawing Sheets

TEMPLATE FOR CUTTING TILES AND THE LIKE

The present invention relates to a template for cutting tiles and the like, i.e. including tiles of carpet, of cork, or of thermoplastic or insulating material, said tiles being intended for laying side-by-side in order to cover a floor, a wall, or a ceiling in a room.

BACKGROUND OF THE INVENTION

These tiles are generally rectangular or square in shape. Peripheral tiles need to be cut prior to being laid so as to be fitted to the more or less irregular contour of the surface being covered. This is the longest and most difficult part of laying tiles. If a tile is cut too short the assembly gradually works loose. If it is cut too long then the tiles are not properly adjusted and they run the risk of warping or coming unstuck.

At present, peripheral tiles are cut in a highly empirical and inaccurate manner after drawing a line of the desired contour on the back of the tile. This drawing is done by means of elementary instruments such as a square, a ruler, and a pencil. As a result there is a risk that mistakes will be made, time wasted, and the cost of laying the tiles will be increased.

The invention seeks to eliminate these drawbacks by providing an instrument, referred to as a "template", which is specially designed initially to accurately take up the contour of the surface to be occupied by a peripheral tile which is to be laid, and secondly to be placed over said tile and used thereover for guiding a cutting tool so that the contour is exactly reproduced on the cut tile.

Another aim of the invention is to provide a template which is simple and robust in design, which is cheap in cost, which is easy to use and to handle, and which is capable of adapting to various contours.

SUMMARY OF THE INVENTION

These results are achieved according to the invention by providing a template for cutting tiles and the like, wherein the template is constituted by a deformable frame comprising five flat strips which are fixed together end-to-end: (a) a thrust strip which is provided with a positioning abutment suitable for being engaged against the edge of a tile; (b) two side strips extending perpendicularly to the thrust strip and slidably mounted to each of the ends thereof, together with guide members which are provided to ensure that said sliding takes place perpendicularly to the thrust strip; (c) a set of two "line-of-cut" strips which are hinged to each other about a hinge axis and each of which is hinged to a corresponding one of the side strips about a shaft capable of sliding longitudinally relative thereto; and locking members provided to fix the strips in the set of strips in a desired position relative to one another.

These strips are easily obtained by being cut from sheet metal.

In a preferred embodiment of the invention, each of the side strips has a longitudinal slot in which a threaded shaft is engaged, said threaded shaft being fixed to the thrust strip and a locking nut such as a butterfly nut being screwed onto said shaft.

The guide members for the side strips may be welded to the thrust strip and against which the inside edges of the said strips are pressed.

Advantageously, the thrust strip is provided with a handle for facilitating manipulation of the instrument.

In the same preferred embodiment of the invention, each line-of-cut strip has a longitudinal slot in which a threaded shaft is engaged, said shaft being fixed to a corresponding one of the side strips, and a locking nut such as a butterfly nut being screwed onto each of said shafts.

Thus, in this embodiment, it is easy, once the set of screws has been loosened, to deform the frame-shaped template so as to adapt it to the shape of the space which is to receive the cut tile, and then to "freeze" the resulting shape by tightening the screws.

The total length of the set of line-of-cut strips (when the two strips are in alignment with each other) is substantially greater than the length of the thrust strip such that the ends of the line-of-cut strips project outwardly beyond the side strips.

When the tiles are square tiles, it is advantageous for the thrust strip and the side strips to have the same length as the side of the tiles.

The positioning abutment may be simply constituted by the outer edge of the thrust strip folded back at a right angle.

In this case, it is advantageous to associate a compensating ruler with the template, with said ruler being adapted to being pressed against the outer edge of the line-of-cut strips (for the purpose of cutting the tile), and the thickness of said ruler being equal to the thickness of the folded-back edge constituting the positioning abutment. The ruler serves to compensate for the offset resulting from the fact that the engagement between the abutment and the tile does not take place on the same side of the abutment when the template is being put into shape (in which case engagement takes place against the adjacent, already-laid tile) and when cutting (in which case engagement takes place against the tile to be cut).

BRIEF DESCRIPTION OF THE DRAWINGS

An embodiment of the invention is described, by way of example, with reference to the accompanying drawings, in which.

MORE DETAILED DESCRIPTION

Figure 1:
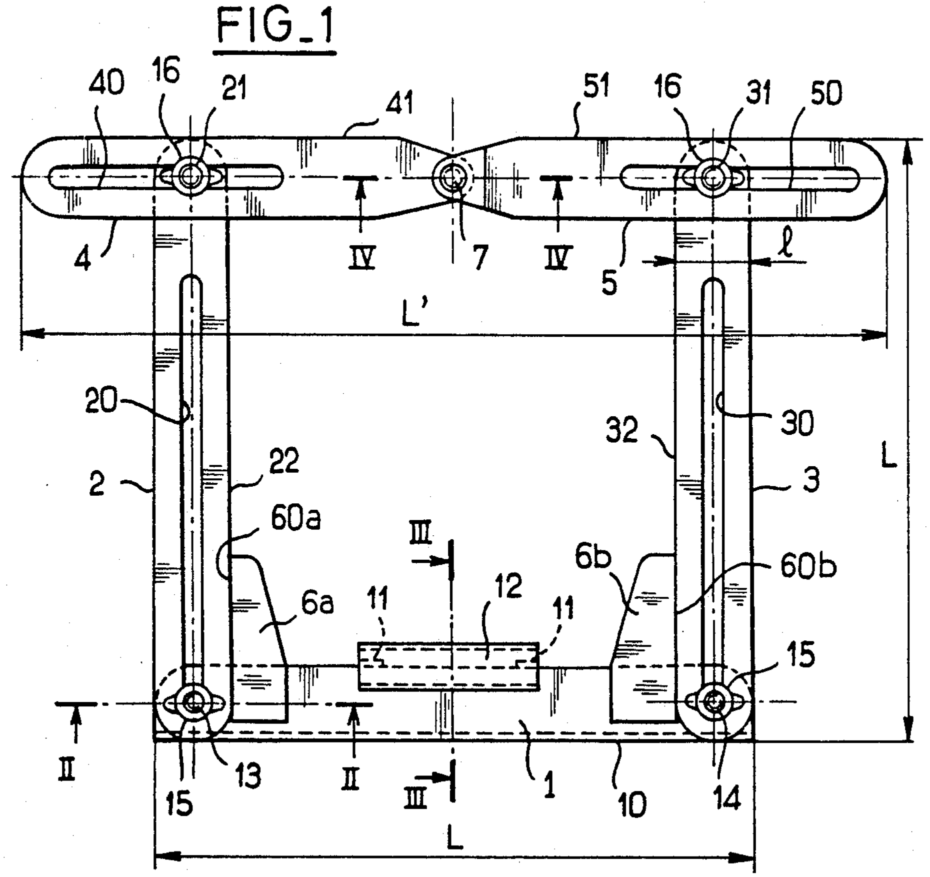
FIG. 1 is a plan view of a template.
Figure 2:
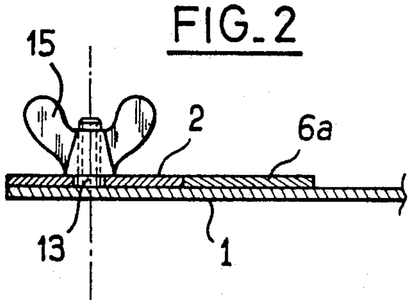
FIGS. 2, 3, and 4 are detailed views on slightly larger scale corresponding to section planes II—II, III—III, and IV—IV in FIG. 1.

The template shown in FIG. 1 is in the form of a frame and comprises five flat strips which are fixed together end-to-end. These strips comprise a "thrust" strip 1, two side strips 2 and 3, and a set of two strips 4 and 5 which are hinged to each other about an axis 7.

The set of strips is made of metal cut out from metal sheet, e.g. from stainless steel sheet.

Figure 3:
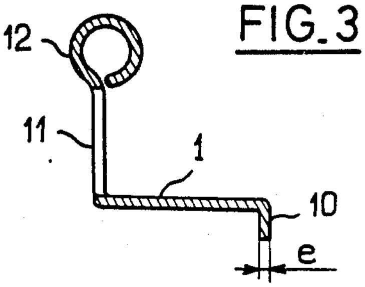
Figure 4:
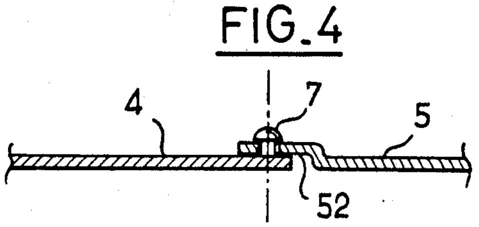

The thrust strip 1 has an edge 10 which is downwardly folded through 90°, as can be seen more clearly in FIG. 3. The thickness of this folded portion 10 corresponds to the thickness of the metal and is given the reference e.

The strip 1 has a handle 12 which is connected to the strip per se by two connection lugs 11, with the entire strip and handle assembly being obtained as a single piece by appropriate cutting, forming, and folding. The handle 12 is generally cylindrical in shape and is obtained by folding.

Each end of the strip 1 is provided with upwardly extending threaded rods 13 or 14, i.e. the rods project in the opposite direction to the folded-down portion 10 and in the same direction as the handle 12.

The threaded rods 13 and 14 are fixed to the strip 1 by any appropriate means, for example by welding. Small plates *6a* and *6b* are fixed, likewise by welding, to project inwardly from the strip so as to have outer edges *60a* and *60b* which define right angles relative to the strip 1.

Each of the side strips 2 and 3 has a longitudinally extending central slot 20 or 30. These slots extend from respective first ends of the strips, i.e. the ends closest to the thrust strip 1, and extend over more than one half of the total length of the strips.

The opposite ends of the strips 2 and 3 are fitted with upwardly directed threaded rods 21 and 31 analogous to the threaded rods 13 and 14 on the thrust strip 1.

Each of the strips 4 and 5, referred to herein as "line-of-cut" strips, forming a part of the set of strips hinged about the axis 7, likewise has a corresponding longitudinal central slot 40 or 50.

The width of the slots 20, 30, 40, and 50 is slightly greater than the diameter of the threaded rods 13, 14, 21, and 31, so that the rods can slide freely along the slots. As can be seen in FIG. 1, the threaded rods 13 and 14 of the thrust strip 1 are engaged in the slots 20 and 30 respectively of the side strips, and the threaded rods 21 and 31 of the side strips are engaged in the slots 40 and 50 respectively of the line-of-cut strips.

Once they have been engaged in the slots, the threaded rods receive easily-operated locking nuts, e.g. butterfly nuts 15 and 16.

It may be observed that at the hinge 7 between the strips 4 and 5, one of these strips (and in particular the strip 5) has a joggle 52 which is required because the remainder of the strip 5 is in the same plane as the strip 4.

The outside edges of the strips 4 and 5 are referenced 41 and 51 respectively while the inside edges of the side strips 2 and 3 are referenced 22 and 33, respectively.

In the embodiment shown, the template is intended to be used for cutting square carpet tiles having a side of 50 cm. That is why the two side strips 2 and 3 and the thrust strip 1 are of the same length L equal to 50 cm.

The assembly constituted by the aligned line-of-cut strips 4 and 5 is of length L' which is substantially greater than 50 cm, e.g. 70 cm.

For example, the strips may be of width (l) 60 mm and the thickness (e) of the metal used may be 3 mm.

As can be seen clearly in FIG. 1, the ends of the side strips 2 and 3 are rounded with the centers of curvature of said ends coinciding with the axes of the threaded rods 13, 21 and 14, 31 respectively. Similarly, the outer ends of the line-of-cut strips 4 and 5 are rounded while the inner ends (corresponding to the hinge 7) are tapering. These rounded portions ensure that the ends do not project beyond the adjacent strips when the strips are pivoted relative to each other, since such projecting portions could get in the way of cutting operations.

It will be immediately obvious from looking at FIG. 1 that the frame constituted by the strips 1 to 5 can be deformed in several ways:

One or other or both of the two side strips 2 and 3 may be slid perpendicularly to the thrust strip 1. The corresponding sliding stroke is equal to the length of the slots 20 and 30. The user who slides the side strips 2 and 3 can ensure that they move perpendicularly to the thrust strip 1 by pressing the side strips lightly inwardly so that their inside edges 22 and 32 respectively rub against the corresponding guide plates *6a* and *6b*. Naturally, such sliding is performed after the butterfly nuts 15 have been loosened.

One and/or both of the line-of-cut strips 4 and 5 can be pivoted about the threaded rods 21 and 31 by causing said rods to slide along the slots 40 or 50 as the case may be. During these displacements the two strips 4 and 5 remain permanently connected to each other by the hinge axis 7.

After the frame constituted by the five strips 1 to 5 has been deformed, it is clear that the outline of the frame can be locked into the resulting position simply by tightening the butterfly nuts 15 and 16.

Figure 8:
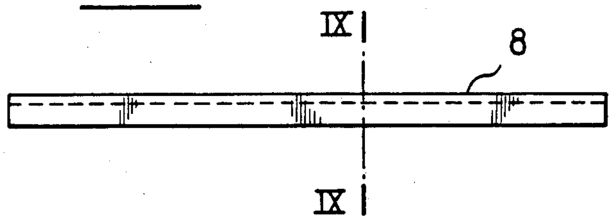
FIG. 8 is a plan view of a compensating ruler.
Figure 9:
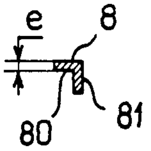
FIG. 9 is a section through the compensating ruler taken on a plane IX—IX of FIG. 8.

FIGS. 8 and 9 show the compensating ruler 8 which is associated with the above-described template. This ruler is in the form of a length of angle bar having two flanges 80 and 81 of thickness e equal to the thickness of the folded-back rim 10 of the thrust strip 1. The function of this ruler is described below.

We now explain, with reference more particularly to FIGS. 5 to 7 and 10 to 14, how the above-described template is used for cutting tiles of covering material so that they can be laid at the periphery of a surface being tiled.

Figure 5:
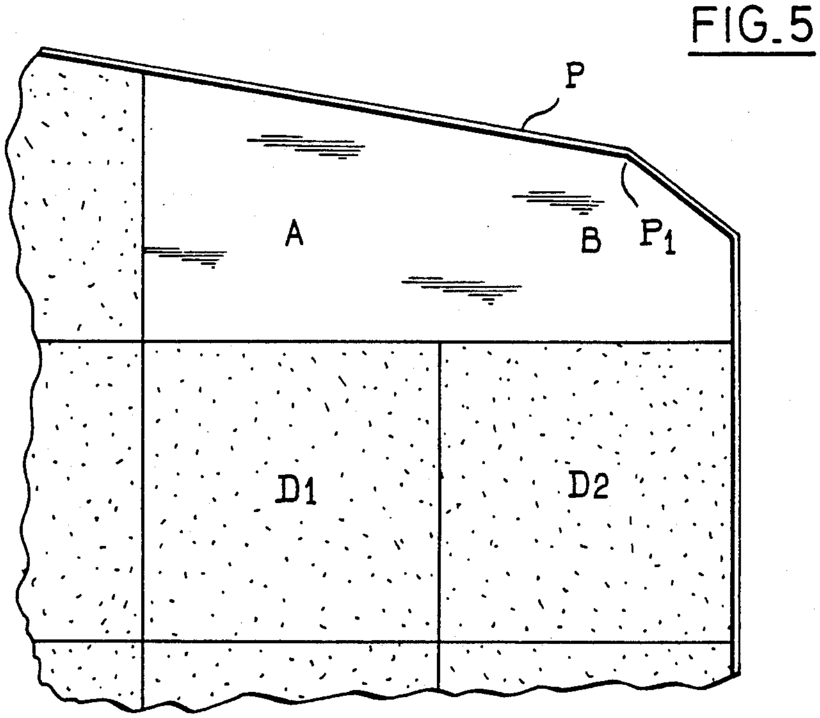
FIG. 5 shows the peripheral zone of an area on which tiles are to be laid.
Figure 6:
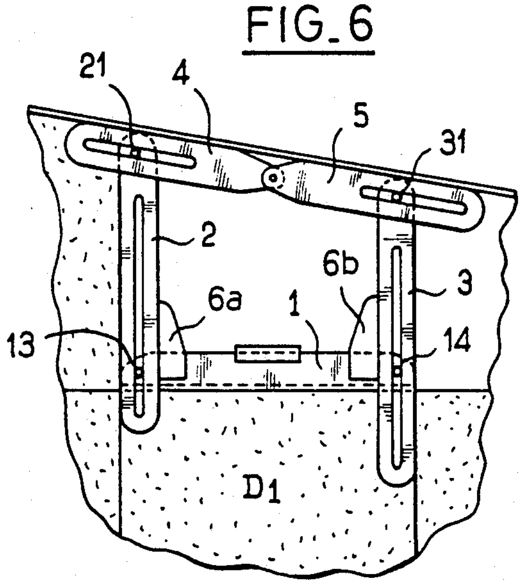
FIG. 6 shows the template put into shape over a portion of said peripheral space, with the template being shown to a scale which is smaller than that of FIG. 1.

FIG. 5 is a plan view of the corner of a room in which floor-covering tiles are being laid, e.g. tiles of carpet. The tiles are square having a side of length L. The skirting delimiting the periphery of the floor receiving the tiles follows a broken contour and the tiles must be cut to match this contour prior to occupying the spaces designated by letters A and B and situated adjacent said skirting (P). The uncut tiles that have already been laid adjacent said spaces are given references D1 and D2 respectively. Prior to cutting a tile, the operator begins by loosening the butterfly nuts 15 and 16 and sliding the side strips 2 and 3 so as to shrink the frame constituted by the template. Then, the outside edge of the thrust strip's abutment-forming folded-down rim 10 is pressed against the free edge of already-laid tile D1 (see FIG. 7). The operator then deforms the frame again, this time to make it larger, while ensuring that the side strips 2 and 3 remain pressed against the guide members 6*a* and 6*b* and perpendicular to the thrust strip 1, and simultaneously positioning the line-of-cut strips 4 and 5 against the skirting P. At this point, the skirting is rectilinear so the strips 4 and 5 are kept in alignment.

The shape of the frame is thus adapted to the outline of the space A which is to receive a cut tile. Once the frame has been shaped, its butterfly nuts 15 and 16 are tightened so as to lock the strips in position relative to one another, thereby "freezing" the shape of the space A.

Figure 10:
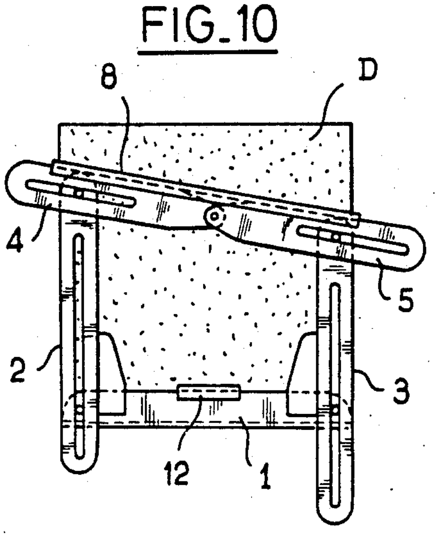
FIG. 10 shows the FIG. 6 template put into place on a tile for the purpose of cutting the tile.

Then, by using the handle 12, the operator places the template on the tile D that is to be cut (see FIG. 10). The template is put into position on the tile D by bringing the downwardly-folded portion 10 into abutment against one of the edges of the tile (see FIG. 11). Thereafter, the compensating ruler 8 is placed against the strips 4 and 5 and the tile is cut by means of any appropriate conventional tool (such as a "cutter") by guiding the tool along the ruler 8.

Figure 7:
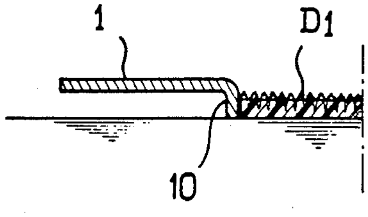
FIG. 7 is a cross-section through the thrust strip showing how the abutment engages against a tile which has already been laid when the template is in the position shown in FIG. 6.
Figure 11:
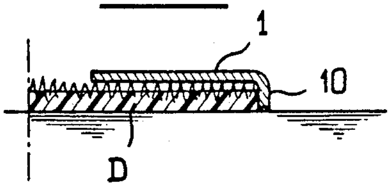
FIG. 11 is a section through the thrust strip and is analogous to FIG. 7, this time showing the thrust strip in abutment against the tile which is to be cut.

The ruler serves to compensate for a dimensional offset of thickness *e* which results from the fact that one side of the abutment 10 is pressed against the tile D which is to be cut whereas the opposite side of the abutment is pressed against the already-laid tile D1, as can be clearly seen by comparing FIGS. 7 and 11.

Figure 12:
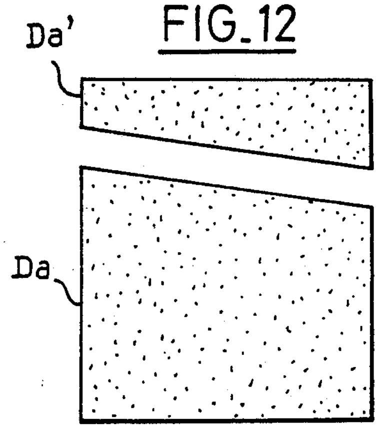
FIG. 12 shows the two portions of the tile after cutting.

After cutting the tile, two tile portions are obtained which are referenced D*a* and D*a'* in FIG. 12. The contour of tile portion D*a* corresponds to the contour of the space A and this cut tile portion is thus ready for laying exactly adjacent to the tile D1, while the tile portion D*a'* is waste material.

Figure 13:
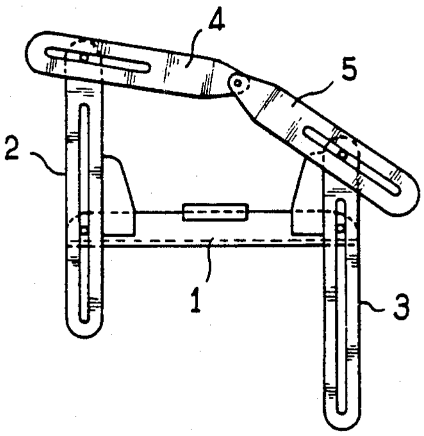
FIG. 13 shows the template in a different configuration from that shown in FIGS. 6 and 10, and corresponding to the other portion of the peripheral space shown in FIG. 5.

The operation is repeated for cutting the tile which is to be juxtaposed to the tile D2 in FIG. 5 so as to fill space B. FIG. 13 shows how the template is shaped for this purpose. As can be seen in the figure, the line-of-cut strips 4 and 5 are at an angle to each other so as to provide a configuration which matches the broken portion P1 of the skirting at this point. For cutting purposes, the compensating ruler 8 is pressed in succession against each of the two strips 4 and 5. It may be observed that the tapering ends of these strips where they are hinged together ensure that they do not get in the way of cutting.

Figure 14:
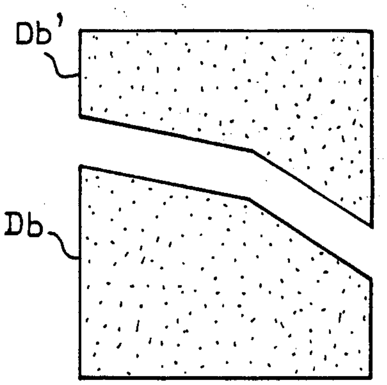
FIG. 14 shows a tile cut using the template when in the shape shown in FIG. 13.

FIG. 14 shows the two portions of tile D*b* and D*b'* which are separated by this cutting operation, with the portion D*b* being suitable for filling space B on the floor to be covered, while portion D*b'* is waste material.

When a tile is to be placed in a corner, it is naturally possible to use the template twice-over in different positions relative to the tile, i.e. by putting it into abutment successively against two adjacent edges of the tile.

Figure 15:
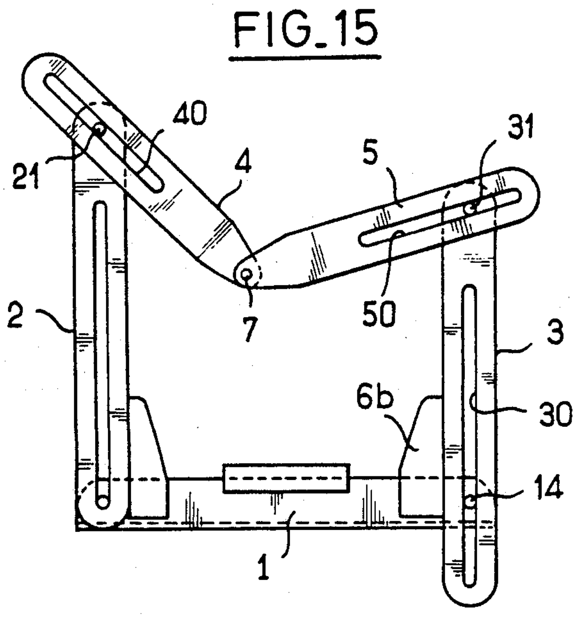
FIGS. 15 and 16 show two other possible configurations of the template.
Figure 16:
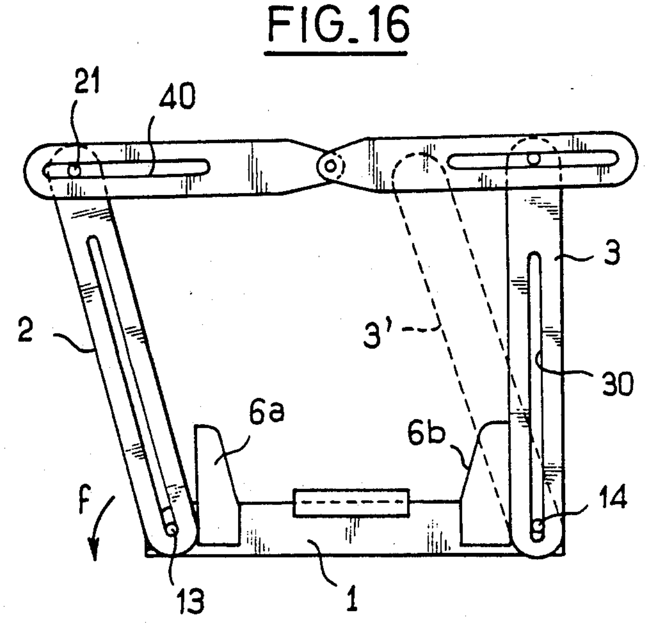

FIG. 15 shows a shape of the template for use when cutting a tile having a re-entrant angle. FIG. 16 shows that the side strips 2 and 3 can be pivoted outwardly by pivoting about the corresponding rods 13 and 14, in which case these rods act as hinge axes. In this figure, the strip 2 has been pivoted outwardly about the rod 13 (arrow *f*). The strips can also pivot inwardly providing they are raised slightly in order to pass over the guide plates 6*a* or 6*b*. This possibility of being pivoted inwardly is shown in FIG. 16 where the strip 3 is shown in dashed lines under the reference 3'.

Pivoting the side strips can be useful for special cuts, in particular for cutting pieces of fitted wall-to-wall carpeting. Naturally, the invention is not limited to the preferred embodiment as described above purely by way of example. It covers any variant that falls within the scope of the claims.

What is claimed is:

1. A template for cutting tiles and the like, wherein the template is constituted by a deformable frame comprising five flat strips which are adjustably connected together: said strips including (a) a thrust strip having a positioning abutment adapted to engage an edge of a tile;

(b) two side strips extending perpendicularly to the thrust strip and slidably connected to respective ends thereof, spaced guide members secured to said thrust strip normally thereof to ensure that movement of the side strips is perpendicular to the thrust strip;

(c) a set of two "line-of-cut" strips hinged to each other about a hinge axis and each of which is hinged to a corresponding one of the side strips about a shaft capable of sliding longitudinally relative thereto; and a plurality of locking members to fix the strips in a desired position relative to one another.

2. A template according to claim 1, wherein the strips are made from sheet metal.

3. A template according to claim 1, wherein each of the side strips has a longitudinal slot in which a threaded shaft is engaged, said threaded shaft being fixed to the thrust strip and one of said locking members assembled onto said shaft.

4. A template according to claim 1, wherein said guide members for the side strips are plates welded to the thrust strip and against which the inside edges of the said side strips are pressed.

5. A template according to claim 1, wherein the thrust strip is provided with a handle.

6. A template according to claim 1, wherein each of the line-of-cut strips has a longitudinal slot in which said shaft is engaged, said shaft being fixed to a corresponding one of the side strips, and one of said locking members assembled onto each of said shafts.

7. A template according to claim 1, wherein the total length of the set of line-of-cut strips is substantially greater than the length of the thrust strip such that the ends of the line-of-cut strips project outwardly beyond the side strips.

8. A template according to claim 1, for cutting square tiles, wherein the thrust strip and the side strips have the same length as the side of the tiles to be cut.

9. A template according to claim 1, the outer edge of the thrust strip being folded back at a right angle defining said positioning abutment.

10. A template according to claim 9, and further including a compensating ruler adopted to engage the outside edges of the line-of-cut strips for cutting purposes, said ruler having the same thickness as said folded-back edge.

* * * * *